United States Patent [19]

Yukiura et al.

[11] Patent Number: 4,794,530

[45] Date of Patent: Dec. 27, 1988

[54] CREDIT SETTLEMENT AND TICKETING TERMINAL SYSTEM

[75] Inventors: Kazuo Yukiura, Tokyo; Keniti Seto, Musashino; Kimio Watanabe, Sagamihara; Hiroshi Harimoto, Seto; Akio Otani, Aichi, all of Japan

[73] Assignees: Hitachi, Ltd.; Japanese National Railways, both of Tokyo, Japan

[21] Appl. No.: 860,508

[22] Filed: May 7, 1986

[30] Foreign Application Priority Data

May 10, 1985 [JP] Japan .................. 60-97832

[51] Int. Cl.$^4$ .............................................. G07F 7/08
[52] U.S. Cl. .................... 364/407; 235/381; 235/384
[58] Field of Search ............... 364/407, 900 MS File; 235/381, 384

[56] References Cited

U.S. PATENT DOCUMENTS

| | | | |
|---|---|---|---|
| 3,622,995 | 11/1971 | Dilks | 364/407 X |
| 3,705,384 | 12/1972 | Wahlberg | 364/407 X |
| 3,984,660 | 10/1976 | Oka | 235/381 |
| 4,247,759 | 1/1981 | Yuris | 235/381 |
| 4,449,186 | 5/1984 | Kelly | 364/407 |
| 4,501,957 | 2/1985 | Perlman | 235/381 X |

FOREIGN PATENT DOCUMENTS 5539992 5/1984 Japan .

Primary Examiner—Jerry Smith
Assistant Examiner—Steven G. Kibby
Attorney, Agent, or Firm—Antonelli, Terry & Wands

[57] ABSTRACT

A credit settlement and ticketing terminal system comprises a terminal unit for issuing request information, and a central unit for performing a processing for ticketing a ticket or the like by referring to the issued request information and a file managed by the central unit, and for delivering results of the processing to the terminal unit to ticket or issue a desired ticket or the like. The central unit includes a processor for processing reservation and ticketing and a calculator for calculating charges for the reservation and ticketing. When the request information from the terminal unit is recognized as credit ticketing request information, the central unit settles the charges incurred by selling on credit, edits results of the credit settlement such that the results and a ticketing data are printed out on different sheets, and delivers as response information, the results and ticketing data to the terminal unit. The terminal unit includes an input device for inputting items of reservation, a card reader for identifying the principal of a reservation applicant, a secret number or password code entry device, means for setting a display indicating that the charges for sales should be settled on credit, a control device for transmitting, as the credit ticketing request information, the inputted information to the central unit upon a transmission starting operation and a printer for printing out a ticket or coupon and the results of credit settlement based on response information from the central unit.

5 Claims, 7 Drawing Sheets

CLEAR – OFF BILL          NO. 1234

MEMBER NO.          123456789

TRANSACTION DATA    59. 10. 15.

TRANSACTION CONTENTS    THE AMOUNT : ¥ 14,000

902

LIMITED EXPRESS TICKET

TOKYO    ▶    NAGOYA

FEB. 15, HIKARI NO.21  DEPARTURE : 6:00  COACH NO. 6, SEAT NO. 3A

¥ 3,500
59. 10. 15.  ISSUED AT TOKYO STATION    | C R |

902a

CREDIT SETTLEMENT AND TICKETING TERMINAL SYSTEM

BACKGROUND OF THE INVENTION

This invention relates to a reservation and ticketing system for tickets and the like and especially to a terminal system suitable for settling adjustment of a charge for a ticket for a reserved seat or a railway ticket (hereinafter referred to as a ticket or the like).

In the past, an independent credit transaction terminal has been used as a credit terminal as disclosed in, for example, Japanese Patent Unexamined Publication Nos. 59-72572, 59-94168 or 55-39992. The independent terminal is well suited for general purposes but in contrast, where charges are settled in accordance with results of processing in a central unit as in the event that charges for reservation and ticketing as well as for selling of tickets or the like are adjusted or balanced on credit, an operation for reservation and ticketing must be performed independently of an operation for selling on credit by means of separate apparatuses, resulting in a need for additional apparatuses and possible erroneous inputting of credit charge.

SUMMARY OF THE INVENTION

An object of this invention is to provide a terminal system which can steadily print out results of credit settlements and tickets or the like by using a terminal unit to which information indicative of a request for reservation and ticketing of tickets or the like and information regarding credit are collectively inputted and by using a central unit responsive to the information inputted to the terminal unit to settle charges for reservation and ticketing on credit and then to send response information indicative of results of the settlement to the terminal unit.

Conventionally, a reservation and ticketing terminal system is independent of a credit settling terminal system, each system having an independent terminal unit. Accordingly, the operation for reservation and ticketing of tickets or the like is performed independently of the operation for credit settlement. Therefore, in the event that a charge incurred by reservation and ticketing is to be settled on credit, information about the charge must additionally be inputted as credit request information and there involve the need for complicated and troublesome operations and the danger of occurrence of errors in the operations.

Since, in accordance with the teachings of the present invention, information indicative of a request for reservation and ticketing of tickets or the like and information necessary for credit settlement are collectively inputted to the same terminal unit, there is no need for additionally inputting the information on the charge incurred by the reservation and ticketing, in order for credit adjustment to be settled. Moreover, where ticketing is effected on the basis of the credit settlement, a clear-off bill may be issued as evidence for exact effectuation of the credit settlement.

BRIEF DESCRIPTION OF THE DRAWINGS

FIG. 9 shows printed-out forms of a clear-off bill and a railway ticket.

DESCRIPTION OF THE PREFERRED EMBODIMENT

The invention will now be described by way of example.

Figure 1:
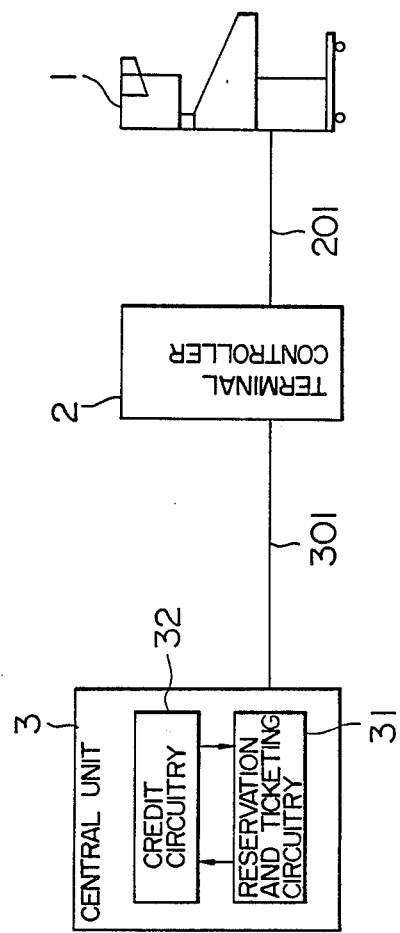
FIG. 1 is a schematic block diagram showing the overall construction of a credit settlement and ticketing terminal system according to an embodiment of the invention.

As schematically shown in FIG. 1, a ticketing system embodying the invention comprises a window terminal unit 1 operable by a window operator or counter clerk working for a station, a terminal controller 2 connected to the terminal unit 1 through a terminal line 201, and a central unit 3 connected to the terminal controller 2 through a central line 301. The central unit 3 includes a reservation and ticketing circuitry 31 which responds to request information from the terminal, to issue a ticket or the like and to total a fare and a charge for the ticket or the like and a credit circuitry 32 which responds to credit request information from the terminal and fare/charge information issued from the reservation and ticketing circuitry 31 to settle the fare and charge for the ticketing in question on credit.

Figure 2:
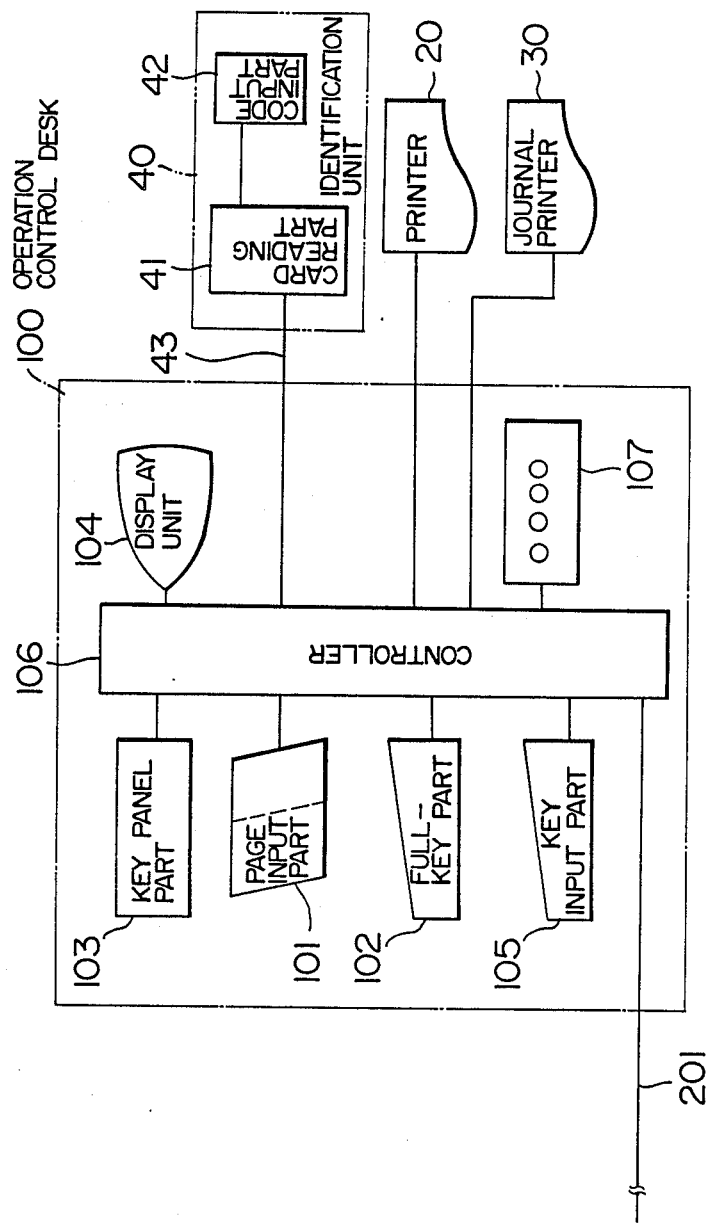
FIG. 2 is a functional block diagram useful to explain the functions of an operation control desk of a terminal.
Figure 3:
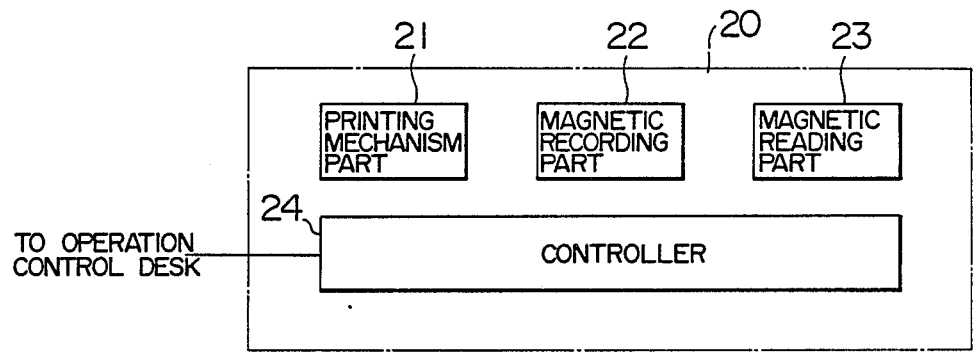
FIG. 3 is a block diagram for explaining the function of a printer.

FIG. 2 shows the construction of the window terminal unit 1 having an operation control desk (console) 100. The operation control desk 100 has a page input part 101 used for designating names of boarding and alighting stations and the name of a train or other mode of transportation which are required upon issuance of a ticket or the like, a full-key part 102 labelled by service information indicative of the kind of operation and the number of sheets for ticketing, a key panel part 103 operable by one touch for inputting a name of station and a boarding section, a display unit 104 for displaying various kinds of input/output information, and a key input part 105 operated by the operator to input information for indication on the display unit 104. Data inputted from the above input parts is edited into ticketing request information by a controller 106 and transmitted to the terminal controller 2 via terminal line 201. Response information transmitted from the central unit 3 is received by the terminal controller 2, where it is processed for, for example, conversion of ticketing information into image data to be printed on the front surface of a coupon, and then sent to the controller 106 of the operation control desk 100. Connected to the operation control desk 100 are a panel 107 provided with lamps for indication of a response contained in the information received by the controller 106 and operation states of the terminal unit, a printer 20 for printing the ticket or the like on the basis of the response information, and a journal printer 30 for journal output.

The printer 20 (referred to as "TPR") has a printing mechanism part 21 for printing the image data from operation control desk 100 on the coupon front surface, and a magnetic recording part 22 for recording magnetic encoded information, also delivered out of the operation control desk 100, on a magnetic film coated on the rear surface of the coupon. The printer 20 also has a magnetic reading part 23 for reading a magnetic record on the rear surface of the coupon once issued at the same or different station, and a TPR control part 24 for controlling the aforementioned parts of the printer 20. A magnetic data read by the magnetic reading part 23 is sent to the central unit 3 via the operation control desk 100 and the terminal controller 2, and is used as, for example, information for cancelling the coupon (i.e., ticket) and may, therefore, be referred to as a cancellation part.

In order to allow the strips unit to transmit information necessary for the central unit to settle a fare and a charge incurred by reservation and ticketing on credit, the window terminal unit 1 has a specific configuration as will be described below.

Figure 4:
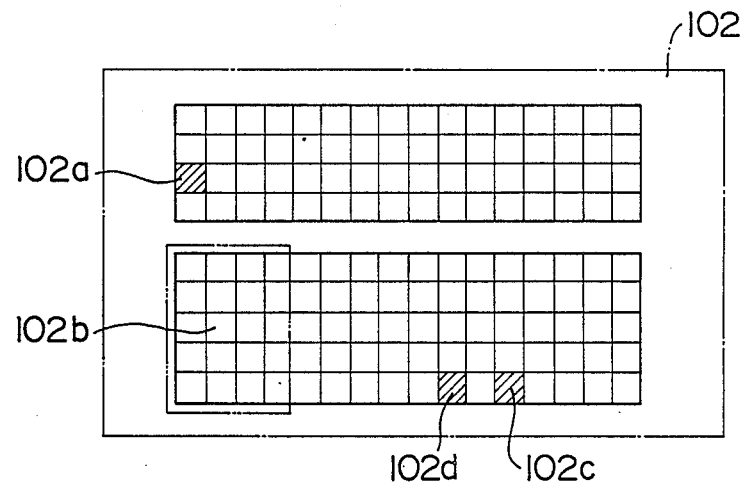
FIG. 4 is an enlarged diagram showing an operation key part shown in FIG. 2.
Figure 5:
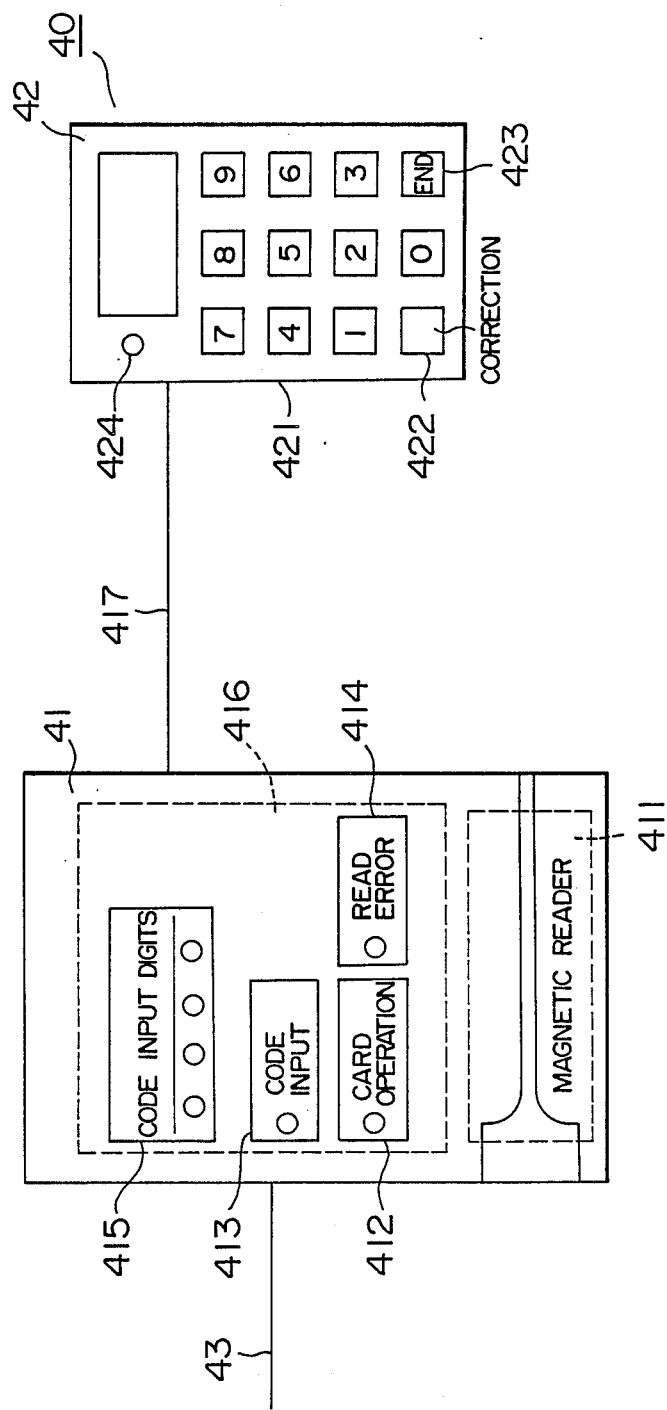
FIG. 5 is a diagram showing the layout, as viewed from outside, of an identification unit shown in FIG. 2.

More particularly, as shown in FIG. 4, the full-key part 102 of operation control desk 100 is defined with a credit button 102a for indicating that an operation is for credit settlement. This credit button 102a is necessarily turned on whenever a charge incurred by ticketing is settled on credit, and the on-state of a lamp associated with the button is set as a full-key data in a transmission message to the terminal controller 2 and central unit 3. Further, in order that a person who is purchasing a ticket or the like on credit can be identified as a member registered for credit in question and only information regarding the credit member is permitted to be inputted, the operation control desk 100 is also connected with an identification (authorization) unit 40 (FIG. 5) which can read a so-called "credit card" presented by the credit member and which can be inputted with a coded number assigned to the credit member in correspondence with the credit card. The identification unit 40 includes two blocks of a card reading part 41 and a code input part 42 and is connected to the controller 106 of operation control desk 100 via a cable 43. The identification unit 40 is constructed as shown in FIG. 5. Thus, the card reading part 41 has a magnetic reader 411 for reading data recorded on magnetic of the credit card and lamps 412 to 415 for indication of operation states of the identification unit 40, and is controlled by a built-in controller 416 for read control of the magnetic reader 411, state control and keying of input data from the code (password) input part and communicated with the operation control desk 100 through interface controlling. The code input part 42 is provided with numerical keys 421 for inputting numerals "0" to "9", a correction key 422 for correction of an inputted code number in course of an operation, an end key 423 for inputting a signal indicative of completion of code input, and a lamp 424 which flashes, when the code input part 42 is permitted for inputting, to urge the operator to key in. In this example, the code input part 42 and the card reading part 41 are housed in separate casings and interconnected by a cable 417. The identification unit 40 is instructed by the operation control desk 100 to be controlled as to whether each of card read and code input operations be rendered valid or invalid. Valid or invalid states of the identification unit are indicated by the lamps 412 to 414 provided for the card reading part 41. The terminal controller 2 provides the operation control desk 100 with instruction information as to whether an input operation to the identification unit be rendered valid or invalid. Specifically, a specified byte of terminal control information is defined as an identification unit validity designating byte and validity or invalidity of operation states of the identification unit is determined in accordance with the contents of the byte. For example, all the input operations to the identification unit are made invalid by a hexadecimal code $(F_0)_{16}$, only the card input operation is made valid by a code $(F_1)_{16}$, only the code number input operation is made valid by a code $(F_2)_{16}$ and both the card input and code number input operations are made valid by a code $(F_3)_{16}$. When receiving the terminal control information, the operation control desk 100 checks the on-state of the lamp associated with the "credit" button 102a and under an AND condition that the lamp is turned on and data of the identification unit validity designating byte is received, it transmits control information to the identification unit 40. In response to the received state setting information, the identification unit 40 causes the "card operation" lamp 412 or the "code input" lamp 413 or both to flash, thereby instructing the operator to input. Upon completion of the corresponding input, the flashing indication lamp 412 or 413 is changed to exhibit a continuous on-state so as to inform the operator of the completion of input. If an error in reading occurs during the card operation, the "read error" lamp 414 is turned on so that the operator is instructed to again carry out a card operation. The card reading part 41 is also provided with the lamp 415 as described previously. This lamp 415 is for indication of a code number input digit. When a code number is inputted from the code input part 42, the corresponding digits are turned on, allowing the operator to confirm the operation content of a credit member being made.

The terminal unit constructed as above is operated as below to fulfil itself when selling a ticket or the like incurring a charge adjustment on credit.

Figure 6:
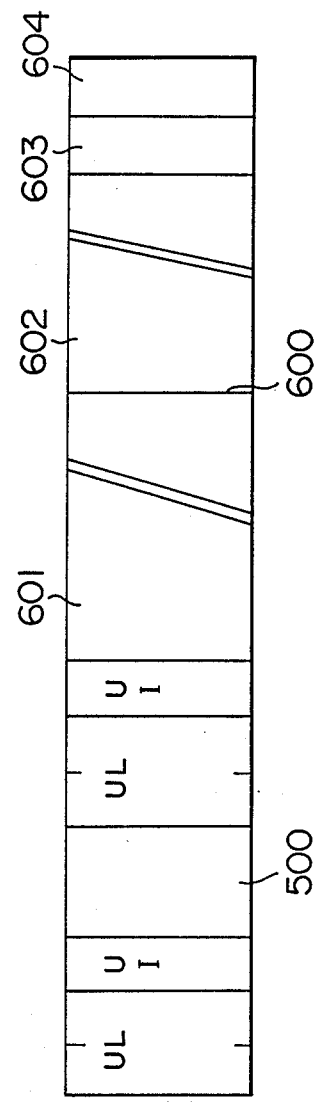
FIG. 6 shows a message format of terminal control information.
Figure 7:
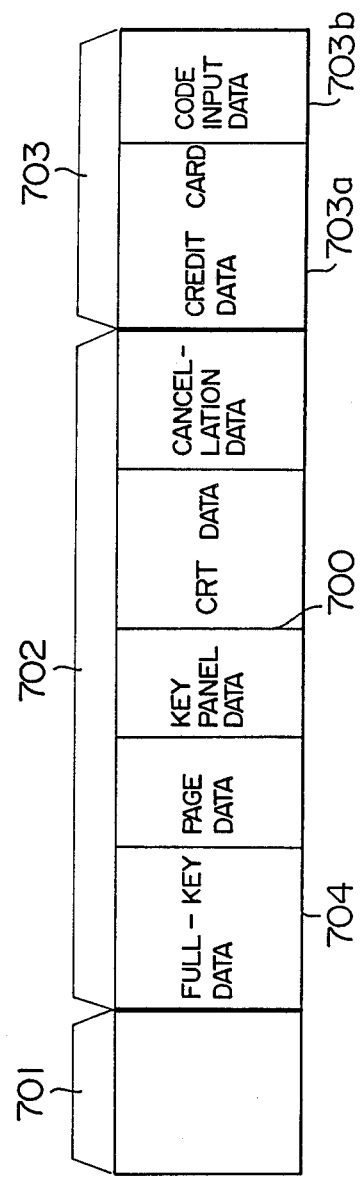
FIG. 7 is a message format of request information from the terminal.

For example, a credit member who intends to purchase a ticket or the like informs the operator at a terminal of the kind of ticket, a boarding section and the number of seats which the credit member desires to obtain, advising that a charge for purchasing the ticket or the like should be settled on credit, and hands over a credit card. Then, the operator or clerk first performs an operation to display a guide picture in accordance with the kind of ticket for ticketing on the display unit. In this embodiment, a picture request key 102b on the full-key part 102 of the operation control desk is depressed to transmit a picture request message to the terminal controller 2. Then, the terminal controller 2 discriminates a position of the picture request key for full-key information set in the picture request message, and sends the corresponding guide picture data 500 and terminal control information 600 for designating control conditions for the terminal, as shown in FIG. 6, to the operation control desk 100. After displaying the received guide picture on the display unit 104, the operation control desk 100 recognizes its control state from contents of the terminal control information 600. The information set in the terminal control information 600 is comprised of preset information 601 for lamps of the full-key part 102, information 602 indicating conditions of completion of transmission preparation for the kind of operation handled in accordance with the picture displayed, information 603 indicative of validity or invalidity of setting of the magnetic reading (cancellation) part 23, and validity condition designation information 604 for the identification unit 40. The preset information 601 for lamps of the full-key part 102 is used to automatically turn on, upon receipt of the guide picture, a lamp associated with either a key in the full-key part 102 which is necessarily keyed in for a service handled in accordance with the guide picture added with the terminal control information 600 or a key to be keyed in for any service. For example, in the case of the guide picture for the credit operation, the "credit" key 102a may be turned on by the preset information. The magnetic reading (cancellation) part validity designating information 603 is used to place the cancellation part 23 in the operable condition. Thus, the operation control desk 100 instructs the printer 20 to inhibit the operation of the cancellation (magnetic reading) part 23 when contents designated by this information is the $(F_O)_{16}$ code and to permit the operation of the cancellation (magnetic reading) part 23 when the contents is the $(F_1)_{16}$ code. The controller 24 of the printer 20 responds to the designated contents to allow or inhibit the operation for reading magnetic information recorded on the rear surface of coupon.

The identification unit validity designating information 604 is ANDed with an on state of the "credit" key of the full-key part included in the operation control desk to determine whether the card read and code input operations, i.e., the essential functions of the identification unit 40 are set in accordance with specifications required in applications of interest. As described previously, the identification unit 40 is instructed by the operation control desk 100 to inhibit both the card read and code input operations in accordance with the hexadecimal code $(F_0)_{16}$, to allow only the card read operation in accordance with the code $(F_1)_{16}$, to allow only the code input operation in accordance with the code $(F_2)_{16}$, and to allow both the card read and code input operations in accordance with the code $(F_3)_{16}$. In this manner, the instruction command places the identification unit 40 in the corresponding operation state. Validity or invalidity of the operation states of the identification unit 40 is indicated, as described previously, by the lamps provided in the card reading part 41.

When the code input is necessary, the lamp provided for the code input part 42 flashes to urge the credit member to input a code number and under this condition, the input operation of ticketing request information and credit request information is made possible. The operator sets the full-key part 102 and sets the request information at a predetermined input area of the guide picture displayed on the display unit 104, so that when the "card operation" lamp of the identification unit 40 flashes, the credit card delivered from the credit member is read by the card reading part. When the "code input" lamp 413 and the lamp 424 of the code input part flash, the credit member inputs a predetermined number of digits of the code number. After the card has been read, the identification unit 40 checks a read data. If the read data is correct, it is transferred to the operation control desk 100. In the operation control desk 100, this data is edited as credit card data into the transmission message. If the data read by the card reading part 41 is recognized as unacceptable through a predetermined checking process such as redundancy check, the "read error" lamp 414 is turned on, thereby instructing the credit member to repeat the operation. When the credit member inputs the code number by depressing the numerical key 421 and then depresses the "end" key 423, the numerical information which has been inputted prior to the depression of the "end" key 423 is transferred to the operation control desk 100.

Then, the operation control desk 100 sets the inputted code input data, like the card data, in the transmission message.

Through the above operations, inputting of the ticketing request information and the credit request information ends. Thus, the operator then depresses a "transmission" key 102c provided in the full-key part. Consequently, the inputted ticketing request information and credit request information are collectively transmitted to the terminal controller 2, causing it to transmit ticketing request information indicative of charge settlement on credit to the central unit 3.

the central unit 3 first analyzes a ticketing request information field 702 in request information 700 with a header 701 by using the reservation and ticketing circuitry 31, whereby a ticket for a reserved seat which requires edition and reservation of the ticketing data is subjected to a reservation processing and a fare and a charge for the corresponding railway ticket are calculated. Based on on-state information of the lamp associated with the "credit" key contained in full-key data 704 in the request information, the reservation and ticketing circuitry 31 discriminates whether the request information 700 in process should be subject to credit settlement. If it is subject to credit settlement, the previously calculated fare/charge information and credit request information 703 (credit card data 703a and code input data 703b) in the request information are transferred to the credit processing circuitry 32. Based on the received fare/charge information and the credit request information 703, the credit circuitry 32 checks creditability limit of the credit member and judges conditions for credit sales. In accordance with results of the judgement, the credit circuitry 32 makes an answer as to acceptance or denial of ticketing and selling to the reservation and ticketing circuitry 31. Receiving the answer, the reservation and ticketing circuitry 31 transmits to the terminal a response which is "YES" (accepted selling and ticketing) or "$\overline{YES}$" (denied selling and ticketing) in accordance with contents of the answer from the credit circuitry 32.

Figure 8:
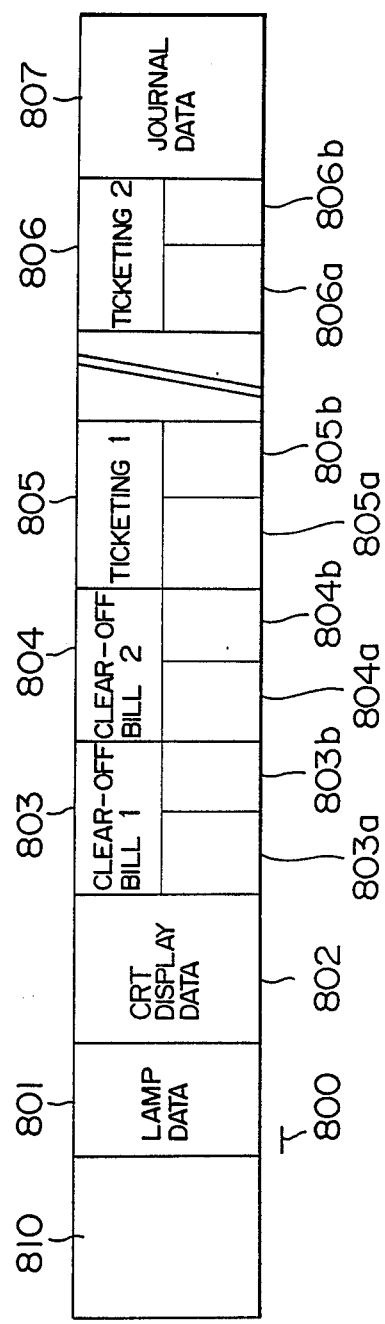
FIG. 8 is a message format of response information.

To complete a response of "YES", the circuitry 31 transmits response information 800 as shown in FIG. 8 for the terminal unit. In the response information 800, a header 810 is sequentially followed by a lamp data 801 for turning on the lamps on the display panel 107 of the operation control desk 100, a display data 802 for displaying the response on the display unit 104, clear-off bill data 803 and 804 (including data 803a to 804b) indicative of contents of credit settlement, information 805 and 806 for printing the ticket or the like, and a journal data 807. Because of transmission control efficiency along the lines 301 and 201, the response information 800 is sometimes divided into a plurality of blocks and transmitted from the central unit 3 to the terminal controller 2 and then from the terminal controller 2 to the operation control desk 100. Receiving the response data 800 by way of the terminal controller 2, the operation control desk has the preference of sequence of reception so as to first turn on the lamps of the display panel 107 in accordance with the lamp data 801 and then to display, for example, charge information and display information incidental to ticketing and selling on the display unit 104 in accordance with the display data 802, thereby informing the operator of the information. Subsequently, the operation control desk 100 converts a clear-off bill data 803a into an image data and delivers it to the printer 20. In the printer 20, the controller 24 cooperates with the printing mechanism part 21 to print out contents of clear-off as shown in FIG. 9 to form a clear-off bill 901. Upon delivery of a clear-off bill magnetic data 803b from the operation control desk 100 to the printer 20, the magnetic recording part 22 provides a necessary magnetic record on the rear surface of a coupon or railway ticket. Usually, plural sheets of the clear-off bills 901 are outputted for the convenience of counterfoil and delivery to the credit member. Following the delivery of the clear-off bill data 803 and 804, especially where a railway ticket is to be issued or ticketed, the printer 20 continues to print out data 805a, 805b, 806a and 806b for ticketing 1 and ticketing n in a similar manner to the clear-off bill. Consequently, there is issued a railway ticket 902 printed on its front surface with railway ticket information and recorded on its rear surface with magnetic information. The railway ticket front surface is also printed with a marking symbol 902a to the effect that the railway ticket is sold on credit. This marking symbol 902a and a magnetic record corresponding thereto (not shown) are formed in accordance with data delivered out of the operation control desk 100.

When ticketing of the ticket or the like on credit has been performed in this manner, the window operator hands one sheet of clear-off bill, the issued ticket and the credit card to the credit member. Thus, the current selling operation ends. A "release" key 102d provided in the full-key part 102 of the operation control desk 100 is depressed in preparation for the next operation, so that the input information and the response information used in the current operation can be cleared.

In order to deduct or cancel the once issued ticket or the like and to deduct or cancel contents of credit settlement for a ticket or the like which has been sold on credit, a guide picture corresponding to the kind of operation in question is displayed. At this time, the operation control desk 100 receives, along with data of the guide picture, the cancellation part validity designating information 603 contained in the terminal control information 600. This information 603 validates the cancellation (magnetic reading) part 23 of the printer 20, causing the cancellation (magnetic reading) part 23 to read the magnetic record data on the coupon rear surface. As a result, cancellation request information is transmitted from the operation control desk 100 to the central unit 3 via the terminal controller 2. For deduction or cancellation, there sometimes occurs the necessity of referring to the information on the issued ticket. Also, for cancellation of credit settlement results, there sometimes occurs the necessity of referring to the information on the clear-off bill. In that event, the necessary information can be read by means of the cancellation (magnetic reading) part 23. As described previously, a coupon sold on credit can be distinguished from a coupon for which a fare and a charge are payed in cash when ticketing, by printing the former coupon with a marking symbol to the effect that this coupon is sold on credit. Accordingly, in refunding fare and charge, the ticket or the like sold in cash is refunded in cash whereas the ticket or the like sold on credit settlement basis is refunded by refunding the credit in the central unit, thereby preventing the credit from being refunded directly in cash.

As has been described, according to the invention, fare and charge incidental to reservation and ticketing can be settled on credit under the direct control of the central unit by collectively transmitting both of the reservation and ticketing request information and credit request information from the terminal to the central unit. Consequently, there is no need of additionally inputting fare/charge information for credit adjustment, thereby simplifying the operation and eliminating errors in inputting the charge information which is important for the credit system. In addition, when the printer normally incorporated in the reservation and ticketing terminal system prints out the clear-off bill indicative of credit settlement results indispensable for the credit system, the terminal system can be constructed economically without the provision of a printer dedicated to the clear-off bill.

We claim:

1. A credit settlement and ticketing terminal system comprising a terminal unit for issuing request information and a central unit for performing at least a processing for ticketing a coupon by referring to the issued request information and a file managed by the central unit, such that results of the processing in said central unit are delivered to the terminal unit to at least issue a desired coupon, said central unit comprising:

means for performing a reservation processing and the ticketing processing;

means for calculating charges for the reservation and ticketing processing, said reservation and ticketing processing means including means for recognizing whether the request information from the terminal unit is credit ticketing request information; and means for settling the charges incurred by selling on credit when the credit ticketing request information is recognized by said recognizing means and for editing the results of a credit settlement and the ticketing data such that the results of credit settlement and the ticketing data are printed out on different sheets, respectively, the results of credit settlement and the ticketing data being delivered as response information to the terminal unit, and said terminal unit comprising:

means for inputting reservation item information;

means for reading card information from a card for identifyng a reservation applicant;

means for inputting code information;

means for setting credit key information representative of whether or not the charges for sales should be settled on credit;

control means for transmitting as the request information said reservation item information, said card information, said code input information and said credit key information to said central unit upon a transmission starting operation such that said credit key information operates as the credit ticketing request information in said control unit; and printer means for printing out the ticketing data and the results of credit settlement on different sheets, respectively, on the basis of the response information received from said central unit, thereby forming a coupon and a clear-off bill;

wherein the ticketing data is printed on a front surface of the coupon, and said terminal unit further comprises means for applying a magnetic record of the results of credit settlement on a rear surface of the coupon, and means for reading and transmitting the contents of the magnetic record as information for cancellation of the credit settlement to said central unit.

2. A credit settlement and ticketing terminal system according to claim 1, wherein said printer means in said terminal unit includes a single printing means for printing the results of credit settlement as the clear-off bill and the ticketing data as the coupon.

3. A credit settlement and ticketing terminal system according to claim 1, wherein said printer means in said terminal unit prints out the results of credit settlement before printing out the ticketing data.

4. A credit settlement and ticketing terminal system according to claim 1, wherein said printer means in said terminal unit prints on the coupon a marking symbol indicating that said coupon is sold on credit.

5. A credit settlement and ticketing terminal system according to claim 1, wherein said central unit further comprises credit processing means responsive to a recognition of the credit ticketing request information by said recognizing means, for receiving information of the charges calculated by said calculating means, the card information and the code input information transmitted from said control means of said terminal unit to determine whether the selling on credit should be accepted.

* * * * *